US012589653B2

(12) United States Patent
Takahashi

(10) Patent No.: US 12,589,653 B2
(45) Date of Patent: Mar. 31, 2026

(54) VEHICLE DISPLAY DEVICE

(71) Applicant: Yazaki Corporation, Tokyo (JP)

(72) Inventor: Nobuyuki Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 19/072,353

(22) Filed: Mar. 6, 2025

(65) Prior Publication Data

US 2025/0196637 A1 Jun. 19, 2025

Related U.S. Application Data

(63) Continuation of application No. PCT/JP2024/000129, filed on Jan. 9, 2024.

(30) Foreign Application Priority Data

Feb. 6, 2023 (JP) ................................ 2023-015778

(51) Int. Cl.
*G09G 5/00* (2006.01)
*B60K 35/23* (2024.01)
*G02F 1/13357* (2006.01)

(52) U.S. Cl.
CPC ........ B60K 35/23 (2024.01); G02F 1/133608 (2013.01); B60K 2360/42 (2024.01); B60K 2360/46 (2024.01); B60K 2360/691 (2024.01)

(58) Field of Classification Search
CPC ... G02B 27/01; G02F 1/133608; B60K 35/00;

B60K 35/22; B60K 35/23; B60K 2360/691; F21S 2/00; F21V 29/503; F21V 29/89; F21Y 2115/10
See application file for complete search history.

(56) References Cited

U.S. PATENT DOCUMENTS

| | | | |
|---|---|---|---|
| 11,586,050 B2 * | 2/2023 | Yueh ...................... | G02B 5/201 |
| 2011/0227487 A1 * | 9/2011 | Nichol ................. | G02B 6/0018 |
| | | | 362/613 |
| 2011/0255303 A1 * | 10/2011 | Nichol ................. | G02B 6/0088 |
| | | | 362/606 |
| 2012/0300486 A1 | 11/2012 | Matsushita et al. | |

FOREIGN PATENT DOCUMENTS

| | | | | |
|---|---|---|---|---|
| JP | 2009288484 A | * | 12/2009 | |
| JP | 2011-090976 A | | 5/2011 | |
| JP | 2011-165624 A | | 8/2011 | |
| WO | WO-2019121084 A1 | * | 6/2019 | .......... H05K 1/0209 |

* cited by examiner

*Primary Examiner* — Joe H Cheng
(74) *Attorney, Agent, or Firm* — Sughrue Mion, PLLC

(57) ABSTRACT

A vehicle display device includes a display device that emits a display light. The display device has a display, a circuit board formed of a conductive metal material and on which a light source is mounted, and a backlight case that accommodates the light source and the display. The circuit board includes a main body on which the light source is mounted and which is connected to ground, and an extension portion extending from the main body toward the display. When assembled to the backlight case, the main body is positioned so as to be exposed from the backlight case and the extension portion is positioned in contact with the display so as to connect the display to the ground via the extension portion and the main body.

4 Claims, 3 Drawing Sheets

VEHICLE DISPLAY DEVICE

CROSS-REFERENCE TO RELATED APPLICATION(S)

This application is a continuation application of International Application No. PCT/JP2024/000129 filed on Jan. 9, 2024 which claims the benefit of priority from Japanese Patent Application No. 2023-015778 filed on Feb. 6, 2023 and designating the U.S., the entire contents of which are incorporated herein by reference.

BACKGROUND OF THE INVENTION

1. Field of the Invention

The present invention relates to a vehicle display device.

2. Description of the Related Art

For example, JP 2011-165 624 A discloses a vehicle display device that includes a display, a plurality of light sources that illuminate the display unit, and a circuit board on which the plurality of light sources are mounted. Moreover, J P 2011-090 976 A discloses a vehicle display device capable of efficiently dissipating heat generated by a light source.

Incidentally, the vehicle display devices described in the above-described Patent Literatures 1 and 2 have room for further improvement in terms of so-called noise countermeasures, in addition to heat dissipation measures for efficiently dissipating heat generated by the light source.

SUMMARY OF THE INVENTION

The present invention is made in consideration of the above circumstance, and has an object to provide a vehicle display device that can appropriately implement noise countermeasures.

In order to achieve the above mentioned object, a vehicle display device according to one aspect of the present invention includes a display device mounted on a vehicle and configured to emit, as a display light, an image that is visually recognized as a virtual image by an occupant of the vehicle toward a display surface provided in the vehicle, wherein the display device includes a metal circuit board formed of a conductive plate-shaped metal material and on which a light source is mounted, a display disposed opposite the light source and emitting the display light, and a backlight case accommodating the light source and the display inside, and the metal circuit board is configured to include a main body on which the light source is mounted and which is connected to a ground, and an extension portion extending from the main body toward the display, and when the metal circuit board is assembled to the backlight case, the main body is arranged to be exposed toward outside of the backlight case, and the extension portion is arranged in contact with the display so as to connect the display to the ground via the extension portion and the main body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the present invention will be described in detail with reference to the drawings.

However, the present invention is not limited to this embodiment. Furthermore, components in the following embodiment include components that are replaceable and easy for those skilled in the art, or components that are substantially identical.

Embodiment

A vehicle display device 1 is applied to a vehicle 400 such as an automobile, and is a head-up display device mounted in an instrument panel (not illustrated) provided on a dashboard of the vehicle 400.

Figure 1:
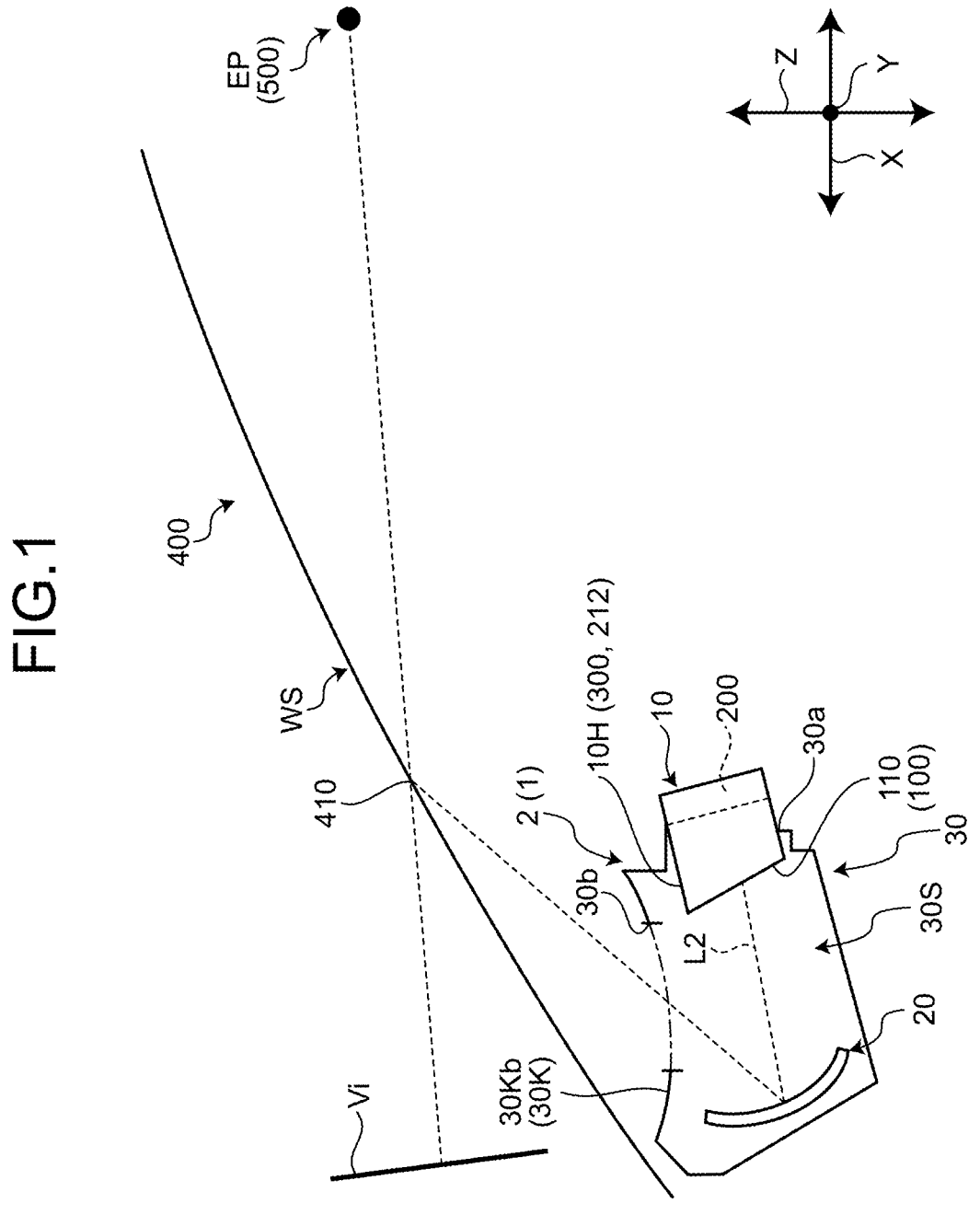
FIG. 1 is a diagram illustrating a schematic configuration of a vehicle display device according to an embodiment.
Figure 2:
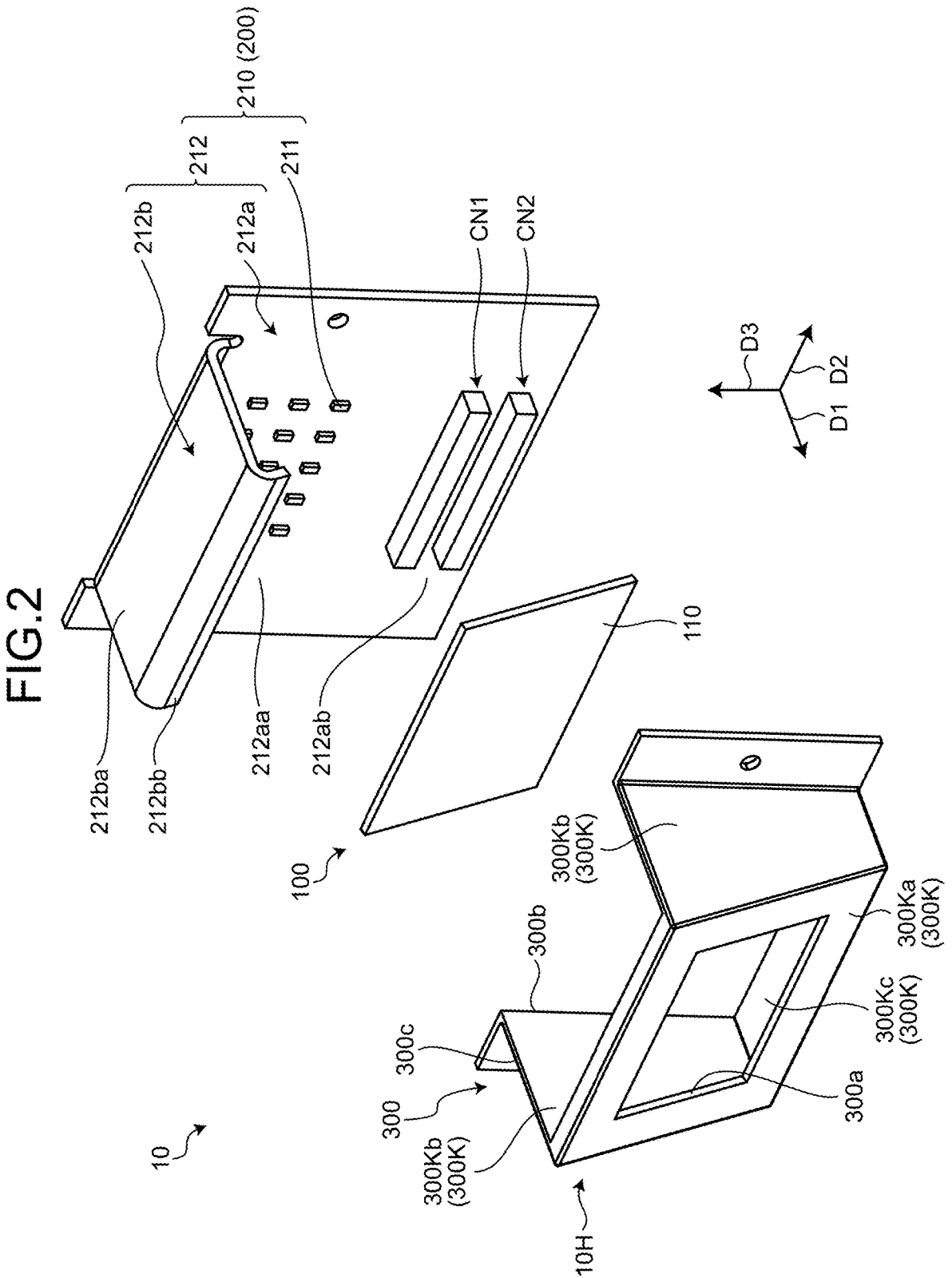
FIG. 2 is an exploded perspective view illustrating a schematic configuration of a display device constituting the vehicle display device according to the embodiment.

As illustrated in FIGS. 1 and 2, the vehicle display device 1 includes a display unit 2 and a control unit (not illustrated), and the display unit 2 includes a display device 10 that emits a display light L2 toward a display surface 410 provided at the front of the vehicle 400. The display device 10 can display an image on a display screen 110 of a display 100 by irradiating the display 100 with an emitted light L1 from an LED chip 211 serving as a light source, and emit the image as the display light L2. In addition, the display unit 2 reflects the display light L2 emitted by the display device 10 toward the display surface 410 toward an eye point (viewing position) EP side, thereby allowing the image reflected on the display surface 410 to be viewed as a virtual image Vi that appears to overlap with scenery visible from the eye point EP. The eye point EP with respect to the vehicle display device 1 is a position of a viewpoint of a driver 500 who is an occupant of the vehicle 400, and is assumed in advance as a spatial region. The display surface 410 on which the display light L2 emitted by the display device 10 is reflected is formed by a windshield WS provided at the front of the vehicle 400. However, the form of the display surface 410 is not particularly limited, and may be, for example, a transparent or semi-transparent panel (for example, a combiner) provided closer to the driver 500 than the windshield WS. In addition, in the vehicle display device 1, a connection method between each component for transmitting and receiving power supply, control signals, various information, or the like may be, unless otherwise specified, a wired connection (including, for example, optical communication via optical fibers) via wiring materials such as electric wires or optical fibers, or a wireless connection such as wireless communication or contactless power supply.

The vehicle display device 1 of the present embodiment realizes a configuration that can appropriately deal with noise by configuring a metal circuit board (equivalent to a metal circuit board) 212 on which the LED chip 211 is mounted, with a main body 212a on which the LED chip 211 is arranged and connected to ground GND, and an extension portion 212b that extends from the main body 212a and is assembled in a state of contact with the display 100. Hereinafter, each component of the vehicle display device 1 will be described in detail with reference to FIGS. 1 to 3.

A width direction of the vehicle display device 1 illustrated in FIG. 1 typically corresponds to a vehicle width direction of a vehicle 400 (hereinafter, referred to as a vehicle width direction Y) to which the vehicle display device 1 is applied. A depth direction of the vehicle display device 1 is typically a front-rear direction of the vehicle 400 (in other words, a traveling direction of the vehicle 400. Hereinafter referred to as a vehicle front-rear direction X) to which the vehicle display device 1 is applied. A front side of the vehicle display device 1 is a side facing a driver's seat of the vehicle 400, and typically corresponds to a side viewed by the driver 500 seated in the driver's seat. On the other hand, a rear side of the vehicle display device 1 is a side opposite to the front side in the depth direction, and typically corresponds to a side that is accommodated inside the instrument panel. In the following description, the side in the vehicle front-rear direction X where the vehicle 400 moves forward may be referred to as the "front" and the side where the vehicle 400 moves backward may be referred to as the "rear". In addition, in a height direction of the vehicle 400 (hereinafter referred to as a vehicle height direction Z), an upper side in the vertical direction may be referred to as an "upper side" and a lower side in the vertical direction may be referred to as a "lower side".

In the following description, in the display device 10, a light emitted from the display screen 110 of the display 100 is referred to as the display light L2. Moreover, a parallel light emitted from a field lens 230 of a backlight 200 is referred to as the emitted light L1, and an axis of the emitted light L1 is referred to as an optical axis L1$x$. An extension direction of the optical axis L1$x$ is referred to as an optical axis direction L1$d$.

Figure 3:
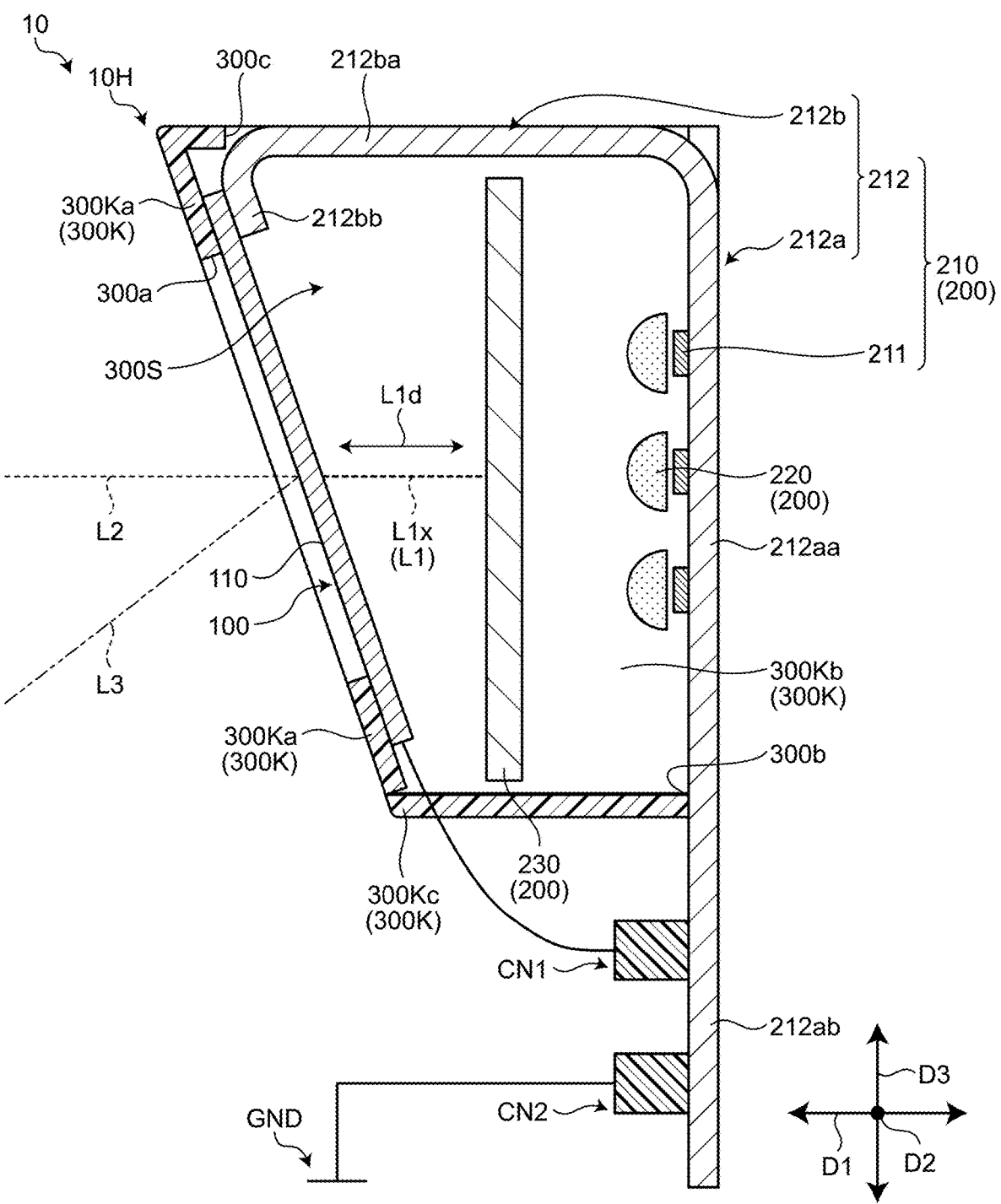
FIG. 3 is a cross-sectional view illustrating the schematic configuration of the display device constituting the vehicle display device according to the embodiment.

The depth direction of the display device 10 illustrated in FIGS. 2 and 3 is referred to as a "device front-rear direction D1", the width direction is referred to as a "device width direction D2", and the height direction is referred to as a "device height direction D3". The device front-rear direction D1, the device width direction D2, and the device height direction D3 are perpendicular to one another. The device front-rear direction D1 is typically a direction along the optical axis direction L1$d$, and when installed in the vehicle 400, is a direction that obliquely intersects with the vehicle front-rear direction X illustrated in FIG. 1. Moreover, the device width direction D2 is typically a direction along the vehicle width direction Y illustrated in FIG. 1. In the following description, in the device front-rear direction D1 of the display device 10, the side where the display 100 is located may be referred to as the "front" and the side where the backlight 200 is located may be referred to as the "rear".

For ease of description, FIG. 2 illustrates only the display 100, an LED board 210, and a backlight case 300 of the display device 10.

In addition, unless otherwise specified, the directions used in the following description are directions when each part of the vehicle display device 1 is assembled, or directions when each part of the display device 10 is assembled.

Display Unit

The display unit 2 is located between the windshield WS and the eye point EP in the vehicle front-rear direction X, and is capable of projecting the virtual image Vi onto the windshield WS, thereby enabling the driver 500 to recognize various information, such as the condition of the vehicle 400. The display unit 2 is controlled by the control unit (not illustrated), and an image generated based on information acquired by the control unit is displayed on the display screen 110 of the display 100, thereby allowing the virtual image Vi to be superimposed on the scenery visible from the eye point EP. As illustrated in FIG. 1, the display unit 2 includes the display device 10, a mirror 20, and a main housing 30.

The display device 10 is a part that emits the display light L2 toward the mirror 20. The display device 10 can display an image on the display screen 110 of the display 100 by irradiating the display 100 with the emitted light L1 from the backlight 200, and emit the light as the display light L2. The display device 10 will be described in detail below.

The mirror 20 is a part that reflects the display light L2 toward the windshield WS. As illustrated in FIG. 1, the mirror 20 has a concave reflecting surface and is capable of magnifying an image. A shape of the reflecting surface may be, for example, a free-form surface, and may be a shape capable of correcting distortion and aberration of an image.

The main housing 30 is made of a resin material or the like, and is formed in a box shape, so that the display device 10, the mirror 20, and the like can be accommodated inside (an internal space portion 30S). As illustrated in FIG. 1, the main housing 30 is formed by a wall portion 30K and includes an assembly opening portion 30*a* into which the display device 10 can be assembled, and an opening portion 30*b* through which the display light L2 can be emitted to the outside.

The assembly opening portion 30*a* is located at the rear side of the main housing 30 and opens along the vehicle front-rear direction X, thereby connecting the inside and outside of the main housing 30. The display device 10 is assembled in a state where the rear side of the backlight case 300 is exposed to the outside of the main housing 30 through the assembly opening portion 30*a*. Therefore, the display device 10 is mounted on the main housing 30 so that the display light L2 emitted from the display 100 is emitted toward the front side, and the display light L2 is blocked by covering a periphery of the display 100 with a wall portion 30K.

The opening portion 30*b* is provided in a wall portion 30Kb located on an upper side of the main housing 30 (a side where the display surface 410 is located), and is a part that connects the inside and outside of the main housing 30 by opening along the vehicle height direction Z. Therefore, when the display light L2 emitted from the display 100 travels toward the opening portion 30*b* via the mirror 20 or the like, the main housing 30 can emit the display light L2 toward the outside. Therefore, when the display unit 2 is mounted in the instrument panel, it can emit the display light L2 toward the display surface 410 located on an upper side of the opening portion 30*b*. The opening portion 30*b* may be closed by a transparent cover that can transmit the display light L2.

Display Device

Next, the display device 10 will be described in detail. The display device 10 is a part that can display an image on the display screen 110 of the display 100 by irradiating the display 100 with the emitted light L1 from the LED chip 211, which serves as a light source, and emits the image forward as the display light L2. As illustrated in FIGS. 2 and 3, the display device 10 includes the display 100, the backlight 200, and the backlight case 300.

The display 100 is a part that transmits the emitted light L1 and emits the light as the display light L2. The display screen 110 of the display 100 is configured with a light-transmitting thin film transistor liquid crystal (TFT Liquid Crystal Display) or the like.

The backlight 200 is a unit including the LED board 210, a condenser lens 220, and the field lens 230.

The LED board 210 includes a plurality of LED chips 211 and the circuit board 212 on which each of the LED chips 211 can be mounted. The LED chip 211 is a light source constituted by a light-emitting diode, and is a component that emits light when supplied with power from a power source (not illustrated) such as a secondary battery of the vehicle 400. The circuit board 212 is made of a plate-shaped conductive metal material, for example, an aluminum plate, and is a member capable of fixing the LED chip 211 in a predetermined region (main body 212a described below). The circuit board 212 is formed by shaping a single metal plate through various processes such as punching, pressing, and bending, so that each part is integrally formed three-dimensionally. The LED chips 211 are arranged in a lattice pattern on the circuit board 212, and when the circuit board 212 is assembled in the backlight case 300, the LED chips 211 are positioned facing the display screen 110, so that light can be emitted toward the display screen 110. The configuration of the circuit board 212 will be described below.

The condenser lens 220 is a lens made of glass or transparent resin. The condenser lens 220 has an entrance surface that is a flat surface and an exit surface that is a convex curved surface, and the entrance surface is disposed so as to face the LED chip 211. As illustrated in FIG. 3, the condenser lens 220 is provided for each LED chip 211, so that the light emitted from the LED chip 211 can be condensed.

The field lens 230 is a lens made of glass or transparent resin. The field lens 230 has an entrance surface and an exit surface, and is disposed so that the entrance surface faces the condenser lens 220. As illustrated in FIG. 3, the field lens 230 is provided between the condenser lens 220 and the display screen 110, and is able to adjust the traveling direction of the light incident from the condenser lens 220 to a predetermined direction. Therefore, the backlight 200 can emit parallel light toward the display screen 110.

The backlight case 300 is made of a resin material, and is a part to which the LED board 210 illustrated in FIG. 2 is attached, so that the above-described display 100, LED chip 211, condenser lens 220, field lens 230, and the like can be accommodated inside. As illustrated in FIGS. 2 and 3, the backlight case 300 is formed by a wall portion 300K, and includes an assembly wall portion 300Ka to which the display 100 can be assembled, a pair of side wall portions 300Kb, and a bottom wall portion 300Kc.

The assembly wall portion 300Ka is a plate-shaped wall portion formed in a substantially rectangular shape. As illustrated in FIG. 2, the assembly wall portion 300Ka is located on the front side of the backlight case 300. The assembly wall portion 300Ka is opened along the device front-rear direction D1 to form an opening portion 300a that communicates between the inside and outside of the backlight case 300. The opening portion 300a is formed in a substantially rectangular shape. Therefore, when the display 100 is assembled, the assembly wall portion 300Ka is positioned so as to surround an edge portion of the display 100 when viewed from the device front-rear direction D1. In addition, as illustrated in FIG. 3, the display 100 is assembled with the assembly wall portion 300Ka in contact with a front surface of the display 100, and the image displayed on the display screen 110 can be exposed through the opening portion 300a, thereby emitting the image as the display light L2. As illustrated in FIG. 3, the assembly wall portion 300Ka in the present embodiment is positioned at an angle with respect to the optical axis L1x of the emitted light L1. Therefore, when the backlight case 300 is assembled to the main housing 30, the assembly wall portion 300Ka is disposed so that its upper end protrudes further forward than its lower end. Therefore, in the display device 10 of the present embodiment, when an external light incident on the main housing 30 is reflected by the display screen 110 of the display 100, the light can be directed as a reflected light L3 in a direction opposite (below) the display surface 410. The display device 10 can change a path of the reflected light L3 so that the reflected light L3 does not return to eyes of the driver 500 by following an incident path of the external light.

The side wall portion 300Kb is a plate-shaped wall portion that is formed in a substantially trapezoidal shape and of which a plate thickness direction is parallel to the device width direction D2. As illustrated in FIG. 2, the pair of side wall portions 300Kb are positioned opposite each other with a gap therebetween along the device width direction D2. The pair of side wall portions 300Kb are formed to be approximately equal in size when viewed from the device width direction D2, and respective side wall portions 300Kb are connected to both ends of the assembly wall portion 300Ka in the device width direction D2.

The bottom wall portion 300Kc is a plate-shaped wall portion that is formed in a substantially rectangular shape and of which a plate thickness direction is parallel to the device height direction D3. As illustrated in FIG. 2, both ends of the bottom wall portion 300Kc in the device width direction D2 are connected to ends of the side wall portions 300Kb located on a lower side in the device height direction D3.

Therefore, the backlight case 300 of the present embodiment is formed integrally with the assembly wall portion 300Ka, the pair of side wall portions 300Kb, and the bottom wall portion 300Kc, and is configured to include an internal space portion 300S formed by the wall portions, an opening portion 300b that opens in the device front-rear direction D1, and an opening portion 300c that opens in the device height direction D3.

The internal space portion 300S is defined and formed by the assembly wall portion 300Ka, the pair of side wall portions 300Kb, and the bottom wall portion 300Kc illustrated in FIG. 2 (see FIG. 3). The internal space portion 300S here refers to a portion that can hold the display 100, the circuit board 212 on which the LED chip 211 is mounted, and the like by any of the assembly wall portion 300Ka, the side wall portion 300Kb, and the bottom wall portion 300Kc. Therefore, the internal space portion 300S includes a space surrounded by a plurality of wall portions, a space partitioned by opposing wall portions, a space located along a wall surface of one wall portion, and the like.

The opening portion 300b is a portion that communicates between the inside and outside of the backlight case 300, and is defined and formed by the pair of side wall portions 300Kb. As illustrated in FIG. 2, the opening portion 300b is located on a rear side in the device front-rear direction D1, and is defined and formed by being interposed between rear ends of the side wall portions 300Kb. Therefore, as illustrated in FIG. 3, the opening portion 300b is disposed with a gap therebetween and faces the assembly wall portion 300Ka.

The opening portion 300c is a portion that communicates between the inside and outside of the backlight case 300, and is defined and formed by the pair of side wall portions 300Kb. As illustrated in FIG. 2, the opening portion 300c is located on an upper side in the device height direction D3, and is defined and formed by being interposed between upper ends of the side wall portions 300Kb. Therefore, as illustrated in FIG. 3, the opening portion 300c is disposed with a gap therebetween and faces the bottom wall portion 300Kc.

Circuit Board

Next, a configuration of the circuit board 212 will be described in more detail. As illustrated in FIGS. 2 and 3, the circuit board 212 includes the main body 212a on which the LED chip 211 is mounted, and the extension portion 212b formed to protrude from the main body 212a.

As illustrated in FIG. 2, the main body 212a is formed in a substantially rectangular shape, and its plate thickness direction is parallel to the device front-rear direction D1. The main body 212a includes a light source unit 212aa having the LED chip 211 mounted on one surface thereof, and a connection portion 212ab to which connectors CN1 and CN2 are connected. The main body 212a is connected to the display 100 via the connector CN1, and is connected to the ground GND via the connector CN2.

The light source unit 212aa of the main body 212a is a unit provided on the upper side in the device height direction D3. When the light source unit 212aa is assembled into the backlight case 300, it is positioned between the pair of side wall portions 300Kb of the backlight case 300, and is arranged along the device height direction D3 toward the bottom wall portion 300Kc, thereby being positioned to block the opening portion 300b. Therefore, the LED chip 211 mounted on the main body 212a is positioned at a distance from the display 100 mounted on the assembly wall portion 300Ka of the backlight case 300, as illustrated in FIG. 3, and is positioned opposite the display 100. The main body 212a is assembled in a state in which the LED chip 211 is accommodated in the internal space portion 300S of the backlight case 300. Further, the main body 212a is arranged so that its outer surface opposite to an inner surface on which the LED chip 211 is mounted is arranged to be exposed toward the outside of the backlight case 300, and is assembled adjacent to the side wall portion 300Kb and bottom wall portion 300Kc of the backlight case 300. Therefore, when the main body 212a is attached to the backlight case 300, the main body 212a can configure a device housing 10H of the display device 10 together with the backlight case 300.

The connection portion 212ab of the main body 212a is a portion provided on the lower side in the device height direction D3. When assembled to the backlight case 300, the connection portion 212ab is disposed outside the backlight case 300. Therefore, the connectors CN1 and CN2 connected to the main body 212a are arranged outside the backlight case 300, as illustrated in FIG. 3, and the main body 212a can suppress noise caused by potential differences by flowing electricity from the connector CN2 to the ground GND.

As illustrated in FIGS. 2 and 3, the extension portion 212b is a portion that is bent in a direction intersecting the extension direction of the main body 212a. The extension portion 212b includes a support portion 212ba extending from the main body 212a toward the display 100, and a contact portion 212bb extending from an end of the support portion 212ba, and is connected to the display 100 via the contact portion 212bb.

The support portion 212ba of the extension portion 212b is a portion formed continuously with the light source unit 212aa of the main body 212a, is formed in an approximately rectangular shape, and is bent along the device front-rear direction D1 that intersects with the extension direction of the main body 212a, so that the device height direction D3 becomes the plate thickness direction. When the support portion 212ba is assembled to the backlight case 300, it is positioned between the pair of side wall portions 300Kb of the backlight case 300, and is positioned along the device front-rear direction D1 from the main body 212a toward the display 100, thereby being positioned to block the opening portion 300c. As illustrated in FIG. 3, the extension portion 212b is disposed with its outer surface exposed toward the outside of the backlight case 300, and is assembled in a state adjacent to the side wall portion 300Kb and the assembly wall portion 300Ka of the backlight case 300. Therefore, when the extension portion 212b is attached to the backlight case 300, the extension portion 212b can configure the device housing 10H of the display device 10 together with the backlight case 300.

The contact portion 212bb of the extension portion 212b is a portion formed to protrude from an end portion located on the front side in the device front-rear direction D1 of the support portion 212ba, and is a portion bent along a direction intersecting the extension direction of the support portion 212ba. As illustrated in FIG. 2, the contact portion 212bb of the present embodiment is formed in a substantially rectangular shape, and is formed in a band shape along the device width direction D2. Also, as illustrated in FIG. 3, the display 100 is assembled with the contact portion 212bb of the extension portion 212b in contact with a rear surface of the display 100, and is fixed by being interposed between the contact portion 212bb of the extension portion 212b and the assembly wall portion 300Ka. Therefore, the circuit board 212 receives electricity from the display 100 via the contact portion 212bb of the extension portion 212b, and by flowing the electricity in the order of the extension portion 212b and the main body 212a, the electricity can be flowed from the connector CN2 connected to the main body 212a toward the ground GND.

The vehicle display device 1 described above is mounted on the vehicle 400 and includes the display device 10 that emits an image as the display light L2 toward the display surface 410 provided on the vehicle 400, which is viewed as the virtual image Vi by an occupant 500 of the vehicle 400. The display device 10 also has the circuit board (metal circuit board) 212 formed from a plate-shaped conductive metal material and on which the LED chip 211 serving as a light source is mounted, the display 100 arranged opposite the LED chip 211 and emitting the display light L2, and the backlight case 300 that accommodates the LED chip 211 and the display 100 therein. In addition, the circuit board 212 is configured to include the main body 212a on which the LED chip 211 is mounted and which is connected to the ground GND, and the extension portion 212b which extends from the main body 212a toward the display 100, and when assembled into the backlight case 300, the main body 212a is arranged to be exposed toward the outside of the backlight case 300. The circuit board 212 is disposed so that the extension portion 212b is in contact with the display 100, thereby connecting the display 100 to the ground GND via the extension portion 212b and the main body 212a.

According to this configuration, the main body 212a of the circuit board 212 absorbs the heat generated when the LED chip 211 emits light, and the side opposite to the surface on which the LED chip 211 is mounted is exposed from the backlight case 300, so that the heat can be efficiently dissipated to the outside. Therefore, the circuit board 212 can be used as a substitute for a heat sink, and the display device 10 can be made smaller by eliminating the need for a heat sink. In addition, the extension portion 212b of the circuit board 212 is positioned in contact with the display 100, so that electricity can flow by moving the electric charge stored in the display 100 from the display 100 toward the main body 212a, and electricity can flow from the main body 212a toward the ground GND. Therefore, the circuit board 212 can suppress the generation of noise due to potential differences between various parts, and can prevent noise from being generated due to static electricity being discharged from the display 100. In addition, since the circuit board 212 is positioned so as to partially cover the internal space (internal space portion 300S) in which the display 100 is accommodated, it can also function as a shield to block noise generated by various components. Therefore, the circuit board 212 can simultaneously serve as a heat dissipation measure and a noise countermeasure in addition to serving as a circuit board on which the LED chips 211 are mounted. Therefore, the vehicle display device 1 can appropriately implement noise countermeasures.

Furthermore, since the vehicle display device 1 does not need to configure heat dissipation components and noise countermeasure components as components separate from the circuit board 212, the number of components can be reduced. Therefore, the vehicle display device 1 can facilitate the assembly of each component.

Furthermore, the backlight case 300 of the vehicle display device 1 described above has the opening portions 300b and 300c that communicate between the inside and outside of the backlight case 300. Furthermore, when the backlight case 300 and the circuit board 212 are assembled together, the main body 212a and the extension portion 212b close the opening portions 300b and 300c of the backlight case 300, thereby forming the device housing 10H of the display device 10. According to this configuration, the backlight case 300 and the circuit board 212 are assembled together to form a box-like shape, thereby forming a single housing. Therefore, in the vehicle display device 1, the circuit board 212 provided with the extension portion 212b as a noise countermeasure is assembled into the backlight case 300, so that an increase in size of the display device 10 can be suppressed.

Furthermore, the backlight case 300 of the vehicle display device 1 described above is made of a resin material. With such a configuration, the backlight case 300 can be made lighter in weight than when it is made of a material such as a metal material. Furthermore, by making the backlight case 300 from a resin material that is easy to process, it can be easily molded into a desired shape.

The above-described vehicle display device 1 of the present invention is not limited to the above-described embodiment, and various modifications are possible within the scope of the claims.

For example, the main body 212a and the extension portion 212b of the circuit board 212 may be assembled in a state where they overlap the wall portion 300K of the backlight case 300.

Furthermore, the shape of the device housing 10H of the display device 10 is not particularly limited. In the present embodiment, the device housing 10H of the display device 10 is configured by assembling the LED board 210 illustrated in FIG. 2 to the backlight case 300, and is composed of two wall portions (main body 212a and extension portion 212b) of the circuit board 212 and four wall portions (assembly wall portion 300Ka, the pair of side wall portions 300Kb, and the bottom wall portion 300Kc) of the backlight case 300. However, the combination of the wall portions constituting the device housing 10H of the display device 10 is not particularly limited as long as the circuit board 212 is configured to include the main body 212a and the extension portion 212b. For example, the circuit board may be configured to include, in addition to the main body 212a and the extension portion 212b, a pair of side wall portions positioned opposite each other at a distance along the device width direction D2, the backlight case 300 may be configured only by the assembly wall portion 300Ka and the bottom wall portion 300Kc, and the device housing 10H of the display device 10 may be configured by four wall portions of the circuit board 212 and two wall portions of the backlight case 300.

Moreover, the backlight case 300 is preferably made of a resin material from viewpoints of weight reduction and workability, but is not particularly limited thereto.

Moreover, the vehicle display device 1 according to the present embodiment may be configured by appropriately combining the components of the above-described embodiment and modification example.

The vehicle display device according to the present embodiment has an effect of being able to appropriately implement noise countermeasures.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device, comprising:
a display device mounted on a vehicle and configured to emit, as a display light, an image that is visually recognized as a virtual image by an occupant of the vehicle toward a display surface provided in the vehicle, wherein
the display device includes a metal circuit board formed of a conductive plate-shaped metal material and on which a light source is mounted, a display disposed opposite the light source and emitting the display light, and a backlight case accommodating the light source and the display inside, and
the metal circuit board is configured to include a main body on which the light source is mounted and which is connected to a ground, and an extension portion extending from the main body toward the display, and when the metal circuit board is assembled to the backlight case, the main body is arranged to be exposed toward outside of the backlight case, and the extension portion is arranged in contact with the display so as to connect the display to the ground via the extension portion and the main body.

2. The vehicle display device according to claim 1, wherein
the backlight case has an opening portion communicating between inside and outside of the backlight case, and when the backlight case and the metal circuit board are assembled together, the main body and the extension portion close the opening portion of the backlight case so as to form a device housing of the display device.

3. The vehicle display device according to claim 2, wherein
the backlight case is made of a resin material.

4. The vehicle display device according to claim 1, wherein
the backlight case is made of a resin material.

* * * * *